United States Patent
O'Brien, III et al.

(10) Patent No.: US 11,397,834 B2
(45) Date of Patent: Jul. 26, 2022

(54) METHODS AND SYSTEMS FOR DATA BACKUP AND RECOVERY ON POWER FAILURE

(71) Applicant: EMC IP Holding Company LLC, Hopkinton, MA (US)

(72) Inventors: Walter A. O'Brien, III, Westborough, MA (US); Thomas N. Dibb, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 16/944,930

(22) Filed: Jul. 31, 2020

(65) Prior Publication Data

US 2022/0035957 A1    Feb. 3, 2022

(51) Int. Cl.
| | |
|---|---|
| *G06F 11/30* | (2006.01) |
| *G06F 12/14* | (2006.01) |
| *G06F 21/79* | (2013.01) |
| *G06F 21/60* | (2013.01) |
| *G06F 1/30* | (2006.01) |
| *G06F 11/14* | (2006.01) |
| *G06F 12/0817* | (2016.01) |

(52) U.S. Cl.
CPC .............. *G06F 21/79* (2013.01); *G06F 1/30* (2013.01); *G06F 11/1451* (2013.01); *G06F 11/1469* (2013.01); *G06F 12/0822* (2013.01); *G06F 12/1408* (2013.01); *G06F 21/602* (2013.01)

(58) Field of Classification Search
CPC .... G06F 1/30; G06F 11/1451; G06F 11/1469; G06F 12/0822; G06F 12/1408; G06F 21/602; G06F 21/79
See application file for complete search history.

(56) References Cited

U.S. PATENT DOCUMENTS

| | | | | |
|---|---|---|---|---|
| 6,910,133 | B1 * | 6/2005 | Cohn | H04L 63/0428 713/192 |
| 7,028,014 | B1 * | 4/2006 | Naclerio | G07B 17/00193 705/401 |
| 7,380,131 | B1 * | 5/2008 | Trimberger | H04L 9/0866 380/37 |
| 7,827,109 | B2 * | 11/2010 | Saito | H04N 21/8358 705/50 |
| 8,307,452 | B2 * | 11/2012 | Jancula | H04L 63/08 726/26 |
| 2002/0194133 | A1 * | 12/2002 | Castueil | H04N 7/1675 705/53 |

(Continued)

OTHER PUBLICATIONS

"Intel Architecture Memory Encryption Technologies Specification"; Intel Corporation; Rev: 1.2; Apr. 2019.

(Continued)

*Primary Examiner* — Gary S Gracia
(74) *Attorney, Agent, or Firm* — Chamberlain, Hrdlicka, White, Williams & Aughtry

(57) ABSTRACT

A method for storing encrypted data in a non-volatile memory device, that includes receiving, by a processor, an indication of a power interruption event; disabling, based on the indication, decryption of encrypted data read from a volatile memory module; copying the encrypted data from the volatile memory module to cache; and copying the encrypted data from the cache to the non-volatile memory device.

18 Claims, 7 Drawing Sheets

(56) References Cited

U.S. PATENT DOCUMENTS

| | | | | |
|---|---|---|---|---|
| 2009/0187704 A1* | 7/2009 | Rodgers | ............... | G06F 21/6281 |
| | | | | 713/193 |
| 2012/0274351 A1* | 11/2012 | Pedersen | ................ | G06F 21/76 |
| | | | | 326/8 |
| 2012/0317382 A1* | 12/2012 | Steed | ................. | G06F 11/1441 |
| | | | | 710/305 |
| 2014/0161259 A1* | 6/2014 | Uchida | .............. | H04N 21/4405 |
| | | | | 380/277 |
| 2016/0352508 A1* | 12/2016 | Guillen-Hernandez | ..................... | |
| | | | | H04L 9/003 |
| 2017/0075820 A1* | 3/2017 | Hartley | ................... | G06F 21/62 |
| 2018/0121674 A1* | 5/2018 | Ernst | .................. | H04L 67/1097 |
| 2018/0129801 A1* | 5/2018 | Cambou | ................. | G06F 21/44 |
| 2020/0150734 A1* | 5/2020 | Ma | ........................ | G06F 1/3243 |

OTHER PUBLICATIONS

David Kaplan, Jeremy Powell, Tom Woller; "White Paper: AMD Memory Encryption"; Advanced Micro Devices, Inc.; Apr. 21, 2016 (https://developer.amd.com/wordpress/media/2013/12/AMD_Memory_Encryption_Whitepaper_v7-Public.pdf).

David Kaplan, Security Architect LSS 2016; "AMD x86 Memory Encryption Technologies"; Advanced Micro Devices, Inc.; Aug. 25, 2016 (https://events.static.linuxfound.org/sites/events/files/slides/AMD%20x86%20Memory%20Encryption%20Technology%20LSS%20Slides.pdf).

* cited by examiner

METHODS AND SYSTEMS FOR DATA BACKUP AND RECOVERY ON POWER FAILURE

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a method for storing encrypted data in a non-volatile storage device, that includes receiving, by a processor, an indication of a power interruption event; disabling, based on the indication, decryption of encrypted data read from a volatile memory module; and initiating copying of the encrypted data from the volatile memory module to the non-volatile storage device.

In general, in one aspect, embodiments relate to a non-transitory computer readable medium that includes instructions which, when executed by a computer processor, enables the computer processor to perform a method for storing encrypted data in a non-volatile storage device, that includes receiving, by a processor, an indication of a power interruption event; disabling, based on the indication, decryption of encrypted data read from a volatile memory module; initiating copying of the encrypted data from the volatile memory module to the non-volatile storage device.

In general, in one aspect, embodiments relate to a node, that includes a non-volatile storage device; a volatile memory module; cache; a processor, where the processor is configured to perform a method for storing encrypted data in the non-volatile storage device, that includes receiving, by the processor, an indication of a power interruption event; disabling, based on the indication, decryption of encrypted data read from the volatile memory module; and initiating copying of the encrypted data from the volatile memory module to the non-volatile storage device.

Other aspects of the invention will be apparent from the following description and the appended claims.

DETAILED DESCRIPTION

Figure 1:
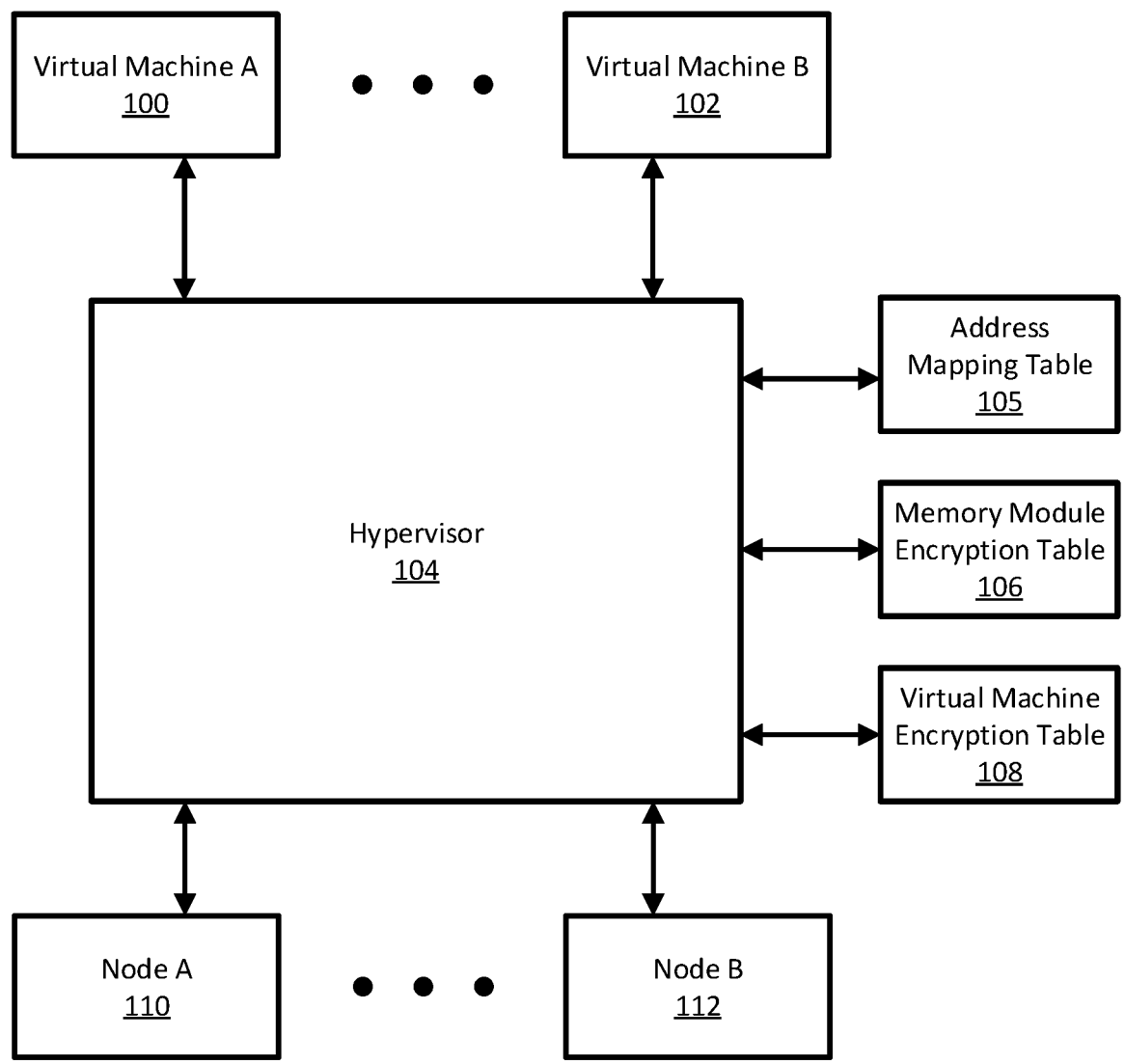
FIG. 1 shows a diagram of system, in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

In general, embodiments of the invention disclosed herein relate to systems, devices, and methods for the resilient encryption of data using a static address of the memory device. Specifically, in one embodiment of the invention, the locations at which data are stored in memory are independently tracked by a software entity (e.g., a hypervisor) such that changes in the hardware layout of the computing devices (e.g., removing, swapping, and/or relocating of memory devices) may be permitted without losing track of the memory device address used for encrypting the data. Accordingly, stronger encryption may be employed (e.g., encryption that uses a memory address in the encryption process) without restricting configurations in the underlying system hardware.

Additionally, other embodiments of the invention provide systems and methods for the efficient backing up of data stored on volatile memory devices (to non-volatile memory devices) in the event of power disruption by reducing processing actions (e.g., without encrypting and decrypting the data). Further, upon restoration of power, that same data may be efficiently restored to its previous location (in volatile memory) in the same form as the data existed prior to that power disruption (e.g., encrypted and/or unencrypted). The invention is not limited by the aforementioned advantages.

FIG. 1 shows a diagram of system, in accordance with one or more embodiments of the invention. The system may include one or more virtual machine(s) (e.g., virtual machine A (100), virtual machine B (102)), a hypervisor (e.g., hypervisor (104)), a memory module encryption table (e.g., memory module encryption table (106)), a virtual machine encryption table (e.g., virtual machine encryption table (108)), and/or one or more node(s) (e.g., node A (110), node B (112)). Each of these components is described below.

In one or more embodiments of the invention, a node (e.g., node A (110), node B (112)) is a computing device (not shown). In one or more embodiments of the invention, a computing device includes one or more processor(s), memory, persistent storage, and/or one or more communication interface(s) (not shown). The persistent storage (and/or memory) may store computer instructions (e.g., computer code) which, when executed by the processor(s) of the computing device, cause the computing device to issue one or more requests and to receive one or more responses. Non-limiting examples of a computing device include a mobile phone, tablet computer, laptop computer, desktop computer, server, distributed computing system, or cloud resource. Additional details regarding node(s) (110, 112) may be found in the discussion of FIG. 2.

In one or more embodiments of the invention, a virtual machine (e.g., virtual machine A (100), virtual machine B (102)) is software, executing on the hardware resources of one or more computing device(s), that provides a virtual environment on which other software executes. In one or more embodiments of the invention, the virtual machine (100, 102) may provide a unified virtual representation of disparate hardware resources to software executing in the virtual machine (100, 102). For example, the virtual machine (100, 102) may generate a single virtual address range that corresponds to two or more different memory module address ranges across two or more memory modules existing within the computing device. Similarly, as another non-limiting example, a virtual machine (100, 102) may provide a virtual "processor" that corresponds to one or more physical processor(s), only a portion of a single processor, and/or two or more portions of two or more processor(s), respectively.

In one or more embodiments of the invention, a hypervisor (e.g., hypervisor (104)) is software, executing on the hardware resources of one or more computing device(s), that creates, manages, and/or contains one or more virtual machine(s) (100, 102). In one or more embodiments of the invention, the hypervisor (104) accesses and utilizes underlying hardware resources (e.g., processors, memory modules) of one or more computing devices in order to initiate the creation of a virtual machine (100, 102). As a non-limiting example, the hypervisor (104) may provide an isolated virtual environment in which a virtual machine executes (e.g., is provided a unique range of virtual memory, virtual processing power, etc.). Further, in one or more embodiments of the invention, a hypervisor may generate, update, and/or otherwise maintain a memory encryption table (106) (described below), a virtual machine encryption table (108) (described below), and an address mapping table (105) (described below). The hypervisor (104) may perform some or all of the method(s) disclosed in FIGS. 5A and 6A and the descriptions of those figures herein.

Additionally, although a hypervisor (e.g., hypervisor (104)) is used throughout this Detailed Description as performing one or more of the disclosed methods, any capable software, executing on any capable hardware, may perform the same processes as a hypervisor. As an example, a traditional operating system, executing on a local machine, may be configured to perform the same functions and execute the same instructions as described for the hypervisor herein. As another example, software executing within a virtualized container environment, within an operating system (or hypervisor), may be configured to execute one or more of the discloses processes. Accordingly, the functionalities of the hypervisor, disclosed herein, should not be limited to the "hypervisor", but may be applicable to any suitable software.

In one or more embodiments of the invention, an address mapping table (e.g., address mapping table (105)) is a data structure that includes data that associates one or more virtual machine address range(s) with one or more corresponding processor address range(s), memory module address range(s), and/or memory module unique identifier (s). As a non-limiting example, an address mapping table (105) may include one or more address mapping entry(ies) (e.g., a row in a table) that associates a virtual machine address range with a processor address range, a memory module address range, and a memory module unique identifier (e.g., as four data entries in that same row of the table). One of ordinary skill in the art, having the benefit of this detailed description, would appreciate that an address mapping table (105) is any data structure that can be used to identify a processor address range, a memory module address range, and a memory module unique identifier associated with a virtual machine address range.

In one or more embodiments of the invention, an address range (e.g., a virtual machine address range, a processor address range, memory module address range, etc.) includes one or more individual memory addresses, virtual or physical, that specifies a location at which data may be stored, modified, and/or retrieved. Accordingly, as used herein, "address range" refers to a series of one or more addresses that correspond to the device with the same name as the modifying adjective ("virtual machine", "processor", "memory module", etc.). Further, in one or more embodiments of the invention, a memory module unique identifier is an alphanumeric expression that uniquely identifies a single memory module (e.g., a memory module serial number, a device unique identifier (DUID), etc.).

In one or more embodiments of the invention, a memory module encryption table (e.g., memory module encryption table (106)) is a data structure that includes data that associates one or more memory module(s) (not shown) with one or more memory module encryption key(s) (not shown), respectively. As a non-limiting example, a memory module encryption table (106) may include one or more memory module encryption entry(ies) (e.g., a row in a table) that associates a memory module unique identifier with a memory module encryption key (e.g., as two data entries in that same row of the table). In one or more embodiments of the invention, an encryption key (e.g., a memory module encryption key) is data used to encrypt other data such that the other data cannot be decrypted without access to a copy of the encryption key. One of ordinary skill in the art, having the benefit of this detailed description, would appreciate that a memory module encryption table (106) is any data structure that can be used to identify an encryption key associated with a memory module.

In one or more embodiments of the invention, a virtual machine encryption table (e.g., virtual machine encryption table (108)) is a data structure that includes data that associates one or more virtual machine(s) (100, 102) with one or more virtual machine encryption key(s), respectively. As a non-limiting example, a virtual machine encryption table (108) may include one or more virtual machine encryption entry(ies) (e.g., a row in a table) that associates a virtual machine unique identifier with a virtual machine encryption key (e.g., as two data entries in that same row of the table). Further, in one or more embodiments of the invention, a virtual machine unique identifier is an alphanumeric expression that uniquely identifies a single virtual machine (e.g., an instance identifier, a universal unique identifier (UUID), etc.). One of ordinary skill in the art, having the benefit of this detailed description, would appreciate that a virtual machine encryption table (108) is any data structure that can be used to identify an encryption key associated with a virtual machine. Further, the encryption key(s) stored in the virtual machine encryption table (108) may also be encrypted. That is, storing encryption keys in plain readable text (e.g., "in the clear") may not be considered a secure practice. Therefore, the encrypted keys in the virtual machine encryption table (108) (or the entirety of the virtual machine encryption table (108)) may also be encrypted such that the local decryption of the data (using a separate set of encryption keys) must be performed prior to reading the virtual machine encryption table (108), or some portion thereof.

Further, in one or more embodiments of the invention, the address mapping table (105) may store a portion or all of the virtual machine encryption table (108). That is, the processor (and or memory controller thereof) may store one or more virtual machine encryption table entries such that the reading and/or decryption of those entries is not repeatedly performed. Accordingly, any lookup of the virtual machine encryption table may be performed using a copy of the virtual machine encryption table stored in the address mapping table (105).

While FIG. 1 shows a specific configuration of a system, other configurations may be used without departing from the scope of the invention. For example, although not shown, virtual machine(s) (100, 102), hypervisor (104), and node(s) (110, 112) may communicate over a network (e.g., a local area network (LAN) and/or wide area network (WAN) (e.g., the Internet)). Further, in one or more embodiments of the invention, as virtual machine(s) (100, 102) and hypervisor (104) are software instances executing on hardware (e.g., a computing device, a node), each instance may, individually, utilize hardware resources of one or more computing device and/or may be executing within a single computing device. Accordingly, embodiments disclosed herein should not be limited to the configuration of devices and/or components shown in FIG. 1.

Figure 2:
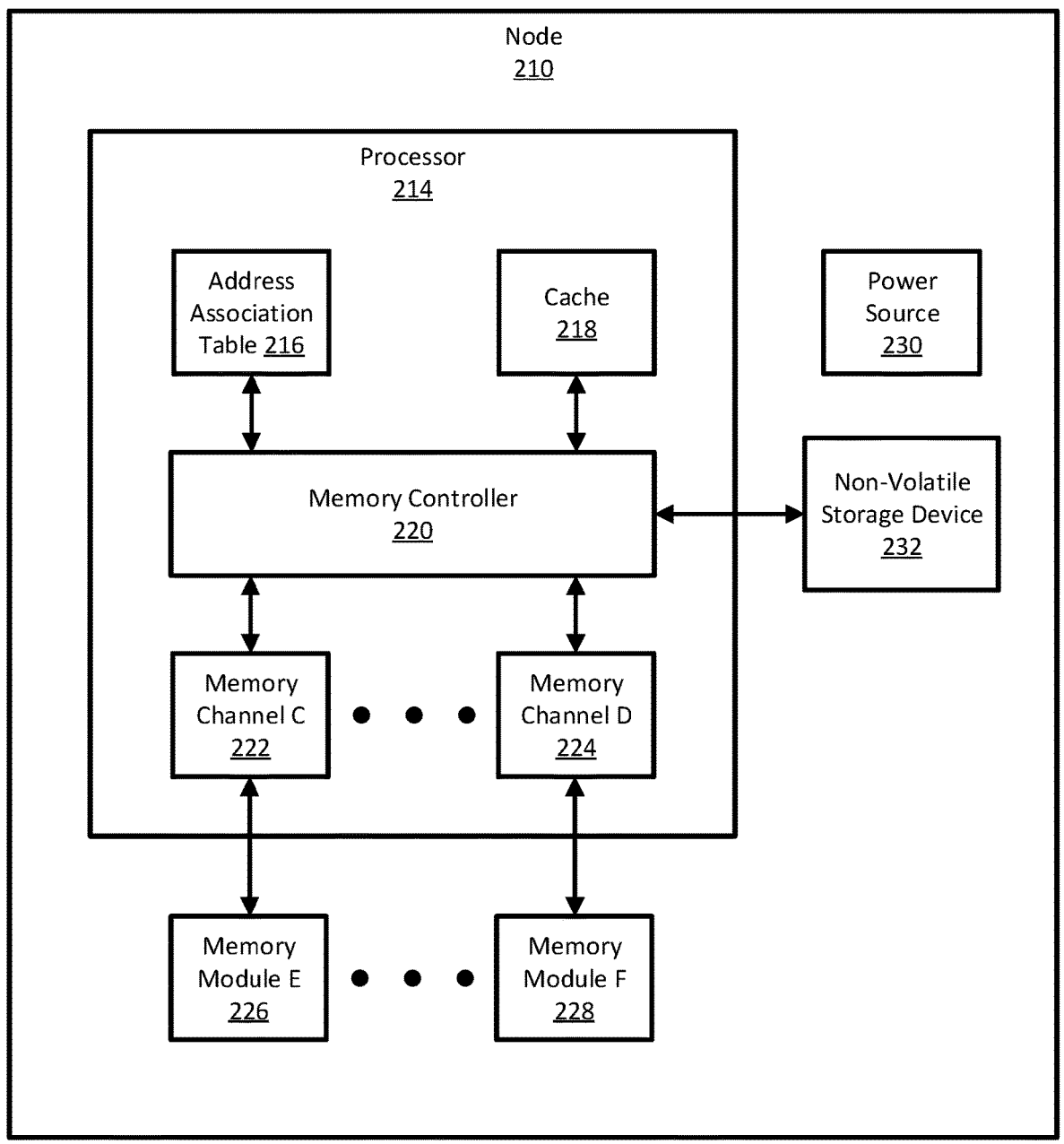
FIG. 2 shows a diagram of node, in accordance with one or more embodiments of the invention.

FIG. 2 shows a diagram of node, in accordance with one or more embodiments of the invention. A node (e.g., node (210)) may include one or more memory module(s) (e.g., memory module E (226), memory module F (228)), a power source (e.g., power source (230)), a non-volatile storage device (e.g., non-volatile storage device (232)), and/or a processor (e.g., processor (214)). Each of these components is described below.

In one or more embodiments of the invention, a memory module (e.g., memory module E (226), memory module F (228), "memory" generally) is one or more hardware devices capable of storing digital information (e.g., data) in a non-transitory medium. In one or more embodiments of the invention, when accessing a memory module (226, 228), other components of node (210) are capable of reading and writing data at the smallest units of data normally accessible (e.g., "bytes"). Specifically, in one or more embodiments of the invention, memory module (226, 228) may include a unique physical address for each byte stored thereon, thereby enabling software to access and manipulate data stored in memory module (226, 228) by directing commands to a physical address of memory module (226, 228) (i.e., a "memory module address range") that is associated with a byte of data (e.g., via a virtual-to-physical address mapping). Accordingly, in one or more embodiments of the invention, software is able to perform direct, "byte-level" manipulation of data stored in memory (unlike, for example, data stored on traditional persistent storage devices, which must first be copied in "blocks" to other, intermediary storage mediums prior to reading and/or manipulating data located thereon).

Accordingly, as used herein, "memory module", "memory", "memory device", "memory storage", and "memory storage device" refer to hardware storage devices that are capable of being accessed and/or manipulated at a "byte-level" regardless of whether that device is volatile, non-volatile, persistent, or non-persistent. Non-limiting examples of memory devices include, but are not limited to, certain integrated circuit storage (e.g., random access memory (RAM), dynamic RAM (DRAM), static RAM (SRAM), resistive RAM (ReRAM), etc.).

In one or more embodiments of the invention, a power source (e.g., power source (230)) is hardware capable of storing electrical energy in chemical energy (e.g., an alkaline power source, a lithium-ion power source) and/or in an electrical field (e.g., a capacitor). In one or more embodiments of the invention, the power source (230) is electrically conductively coupled to one or more components of the node (210) to provide electrical power in the event that an external power source is interrupted. As a non-limiting example, the power source (230) is configured to automatically provide power to the processor (214), any component of the processor (e.g., memory controller (220)), one or more memory modules (226, 228), non-volatile storage device (232), and any other device of FIG. 2.

In one or more embodiments of the invention, a non-volatile storage device (e.g., non-volatile storage device (232)) is one or more hardware devices capable of storing digital information (e.g., data) in a non-transitory medium. In one or more embodiments of the invention, a non-volatile storage device (232) is capable of persisting data in a non-volatile medium such that, if electrical power is not supplied to the hardware, the data stored on the non-volatile storage device (232) is retained. A non-volatile storage device (232) may be any form of storage that is capable of storing data in a non-volatile medium (regardless of whether that data is written and/or read at a "byte-level" or "block-level"). Non-limiting examples of a non-volatile storage device include solid state devices (e.g., a flash memory device), magnetic storage devices, and optical storage devices.

In one or more embodiments of the invention, a processor (e.g., processor (214)) is an integrated circuit for processing instructions (e.g., those of node (210) and/or those received via a communication interface (not shown)). In one embodiment, a processor (214) may be one or more processor cores or processor micro-cores. Additionally, in one or more embodiments of the invention, the processor (214) (and/or memory controller (220) thereof) is configured to generate, modify, and/or otherwise maintain the address association table (216) (described below). The processor (214) may perform some or all of the method(s) disclosed in FIGS. 4, 5B, 6B, 7A, and 7B and the descriptions of those figures herein. Further, a processor (e.g., processor (214)) may include an address association table (e.g., address association table (216)), cache (e.g., cache (218)), a memory controller (e.g., memory controller (220)), and/or one or more memory channel(s) (e.g., memory channel C (222), memory channel D (224)). Each of these components is described below.

In one or more embodiments of the invention, an address association table (e.g., address association table (216)) is a data structure that includes data that associates one or more processor address range(s) (not shown) with one or more memory channel(s) (e.g., 222, 224) and one or more memory module address range(s) (not shown), respectively. As a non-limiting example, an address association table may include one or more address association entry(ies) (e.g., a row in a table) that associates a processor address range with a memory channel identifier and memory module address range (e.g., as three data entries in that same row of the table). Additional details regarding address association table (216) may be found in the discussion of FIG. 3.

In one or more embodiments of the invention, cache (e.g., cache (218)) is one or more hardware devices capable of storing digital information (e.g., data) in a non-transitory medium. Cache (218) may be used by the processor (214) to perform operations on data, as requested by one or more software instances (e.g., a virtual machine, hypervisor, etc.) and/or other hardware components (e.g., the memory controller (220), etc.). In one or more embodiments of the invention, cache (218) is allocated and/or divided into one or more regions (not shown) that are used to temporarily store data before a copy of that data is persisted on another storage device. In one or more embodiments of the invention, cache (218) is a limited resource (e.g., little total space) and may therefore reach its maximum capacity more quickly than other devices that store digital information. However, although limited in total capacity, cache (218) may provide less latency when used to perform operations (e.g., reading, writing) compared to other storage devices (e.g., memory modules (226, 228), non-volatile storage device (232)).

In one or more embodiments of the invention, a memory controller (e.g., memory controller (220)) is hardware within the processor (214) that copies data to and from cache (218) and may further encrypt and decrypt data as the data traverses the memory controller (220). The memory controller (220) may perform some or all of the method(s) disclosed in FIGS. 4, 5B, 6B, 7A, and 7B and the descriptions of those figures herein.

In one or more embodiments of the invention, a memory channel (e.g., memory channel C (222), memory channel D (224)) is a collection of conductive pathways between the memory controller (220) and one or more memory module(s) (226, 228). In one or more embodiments of the invention, a memory module (226, 228) may be uniquely associated with a memory channel (222, 224); however, (although not shown in FIG. 2) a memory channel (222, 224) may be associated with two or more memory modules (226, 228). In one or more embodiments of the invention, the memory channel(s) (222, 224) may each include some standardized number of pins (e.g., 8, 16, 32, etc.) that correspond to a similar number of conductive electrical contacts on a memory module and allow for an operative connection between the devices. Memory channels (222, 224) may be identified via a unique memory channel identifier assigned by the processor (214) and/or the memory controller (220) (e.g., "0", "1", "2", etc.).

While FIG. 2 shows a specific configuration of a node, other configurations may be used without departing from the scope of the invention. Accordingly, embodiments disclosed herein should not be limited to the configuration of devices and/or components shown in FIG. 2.

Figure 3:
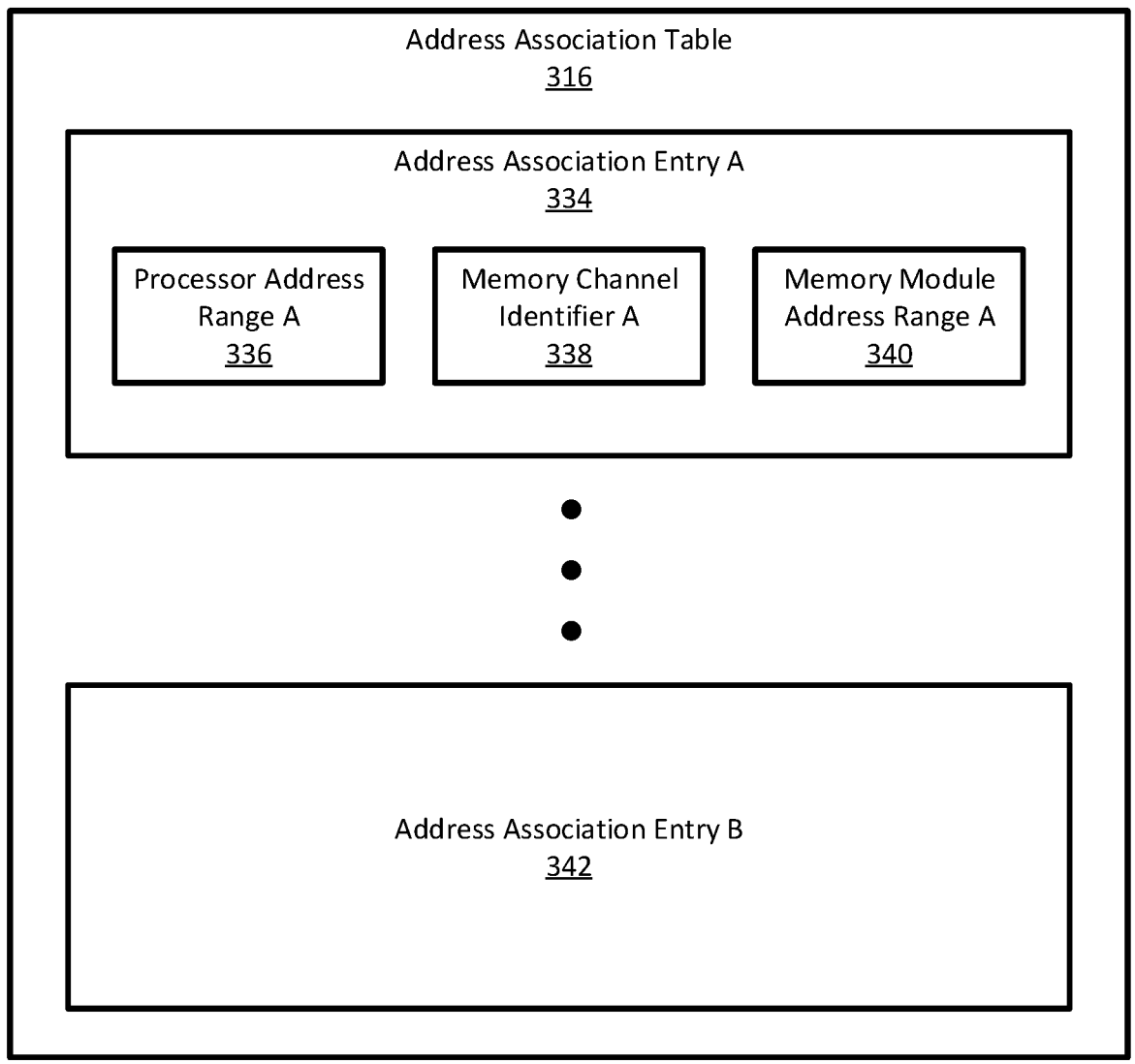
FIG. 3 shows a diagram of address association table, in accordance with one or more embodiments of the invention.

FIG. 3 shows a diagram of an address association table, in accordance with one or more embodiments of the invention. An address association table (e.g., address association table (316)) may include one or more address association entry (ies) (e.g. address association entry A (334), address association entry B (342)). Further, each address association entry (334, 342) may include a processor address range (e.g., processor address range A (336)), a memory channel identifier (e.g., memory channel identifier A (338)), and/or a memory module address range (e.g., memory module address range A (340)). Each of these components is described below. In one or more embodiments of the invention, the address association table (316) may be implemented as a page table, data stored in a translation lookaside buffer (TLB), and/or any other data structure maintained by the processor for tracking, mapping, and accessing physical memory devices (e.g., memory modules, non-volatile storage device).

In one or more embodiments of the invention, an address association entry (e.g. address association entry A (334), address association entry B (342)) is a data structure within the address association table (316) that associates a processor address range (336) with a memory channel identifier (338) and memory module address range (340). In one or more embodiments of the invention, an address association entry (334, 342) may be a row within the address association table that associates two or more data elements (e.g., 336, 338, 340) by virtue of their inclusion within that same row.

In one or more embodiments of the invention, a processor address range (e.g., processor address range A (336)) is a range of virtual addresses (e.g., identifiable locations) that correspond to one or more memory channel(s) (and the one or more memory module(s) attached thereto), respectively. In one or more embodiments of the invention, a processor (and/or the memory controller thereof) may allocate one or more processor address ranges that correspond to one or more memory module address range(s) (e.g., 340) of attached memory modules.

In one or more embodiments of the invention, a memory channel identifier (e.g., memory channel identifier A (338)) is an alphanumeric expression that uniquely identifies a single memory channel (e.g., via indexing, 0, 1, 2, etc.). Further, in one or more embodiments of the invention, the memory channel, identified by the memory channel identifier (e.g., 338), corresponds to the processor address range (e.g., 336) within the same address association entry (e.g., 334). As a non-limiting example, processor address range A (336) may correspond to addresses 1-32 KiB, which belong to memory channel A (identified by memory channel identifier A (338)) and correspond to memory module address range A (340).

In one or more embodiments of the invention, a memory module address range (e.g., memory module address range A (340)) is a range of physical addresses (e.g., identifiable locations) that correspond to one or more physical locations in a memory module capable of storing data. In one or more embodiments of the invention, a single physical location of a memory module corresponds to the smallest unit of data (e.g., a byte) that may be read or modified within a single transaction with that memory module. Accordingly, in one or more embodiments of the invention, the number of memory module addresses within a memory module address range (e.g., 340) corresponds to an equal number of "bytes" allocated to that memory module address range (e.g., 340). One of ordinary skill in the art, having the benefit of this detailed description, would appreciate that a memory module address range corresponds to range of memory addresses on a memory module.

In one or more embodiments of the invention, address translation may include multiple address translation for two or more software and/or hardware layers (each using virtual and/or physical addresses associated across those layers). For example, a virtual machine address may be translated (e.g., via a page table) to a host computer virtual address. The resulting host computer virtual address may be translated (e.g., via page tables) to a processor address. Then the processor address may be translated (e.g., using a memory map) to a memory channel, memory module on that channel, and memory module address (on that channel).

Further, in one or more embodiments of the invention, the address association table (316) may store a portion or all of the virtual machine encryption table (discussed in the description of FIG. 1). That is, the processor (and or memory controller thereof) may store one or more virtual machine encryption table entries such that the reading and/or decryption of those entries is not repeatedly performed. Accordingly, any lookup of the virtual machine encryption table may be performed locally by the processor using a copy of the virtual machine encryption table stored in the address association table (316). Further, this stored copy of the virtual machine encryption table may be unreadable outside of the processor, therefore allowing for the data to be stored in an unencrypted state (i.e., "in the clear").

While FIG. 3 shows a specific configuration of an address association table, other configurations may be used without departing from the scope of the invention. Accordingly, embodiments disclosed herein should not be limited to the configuration of devices and/or components shown in FIG. 3.

Figure 4:
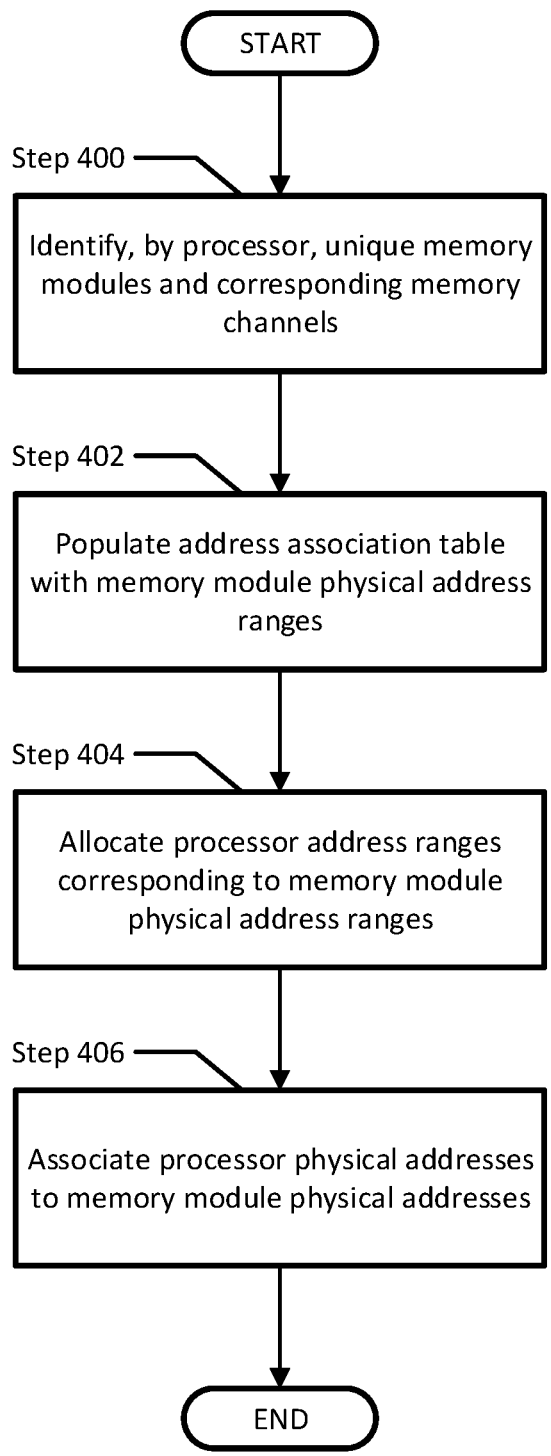
FIG. 4 shows a flowchart of a method of identifying available memory modules and allocating address ranges, in accordance with one or more embodiments of the invention.

FIG. 4 shows a flowchart of a method of identifying available memory modules and allocating address ranges, in accordance with one or more embodiments of the invention. All or a portion of the method shown in FIG. 4 may be performed by one or more components of the processor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 400, a processor identifies the unique memory modules and corresponding memory channels of the node. In one or more embodiments of the invention, upon initial startup of a node and/or due to a detected change in the underlying system hardware, the processor, and/or memory controller thereof, identifies each of the memory modules operatively connected to the processor. The memory modules and the memory controller may communicate via some standard method that provides the identification, type, and capabilities of the connected hardware devices.

In Step 402, the processor populates the address association table with memory module physical address ranges. In one or more embodiments of the invention, the address association may already exist (with one address association entry for each memory channel identifier) or the processor may generate the address association table and populate the table with an address association entry for each memory channel (and add each memory channel identifier to each entry, respectively).

In one or more embodiments of the invention, after identifying (e.g., discovering) each of the attached memory modules (in Step 400), the processor may identify the size of each attached memory module and populate each address association entry with the memory module address range of the memory module operatively connected to the associated memory channel.

In Step 404, the processor allocates processor address ranges corresponding to memory module physical address ranges. In one or more embodiments of the invention, the processor and/or memory controller generates one or more range(s) of virtual addresses for the processor that correspond to one or more memory module address range(s).

In one or more embodiments of the invention, the processor may interleave processor address ranges across the available memory channels (e.g., mapping each sequential processor address to a different memory channel than the previous processor address). Alternatively, the processor may allocate and assign process address ranges that correspond in size with the memory module address ranges. One of ordinary skill in the art, having the benefit of this detailed description, would appreciate that the processor may assign processor address ranges to memory module address ranges using conventional methods of assignment.

In Step 406, the processor associates processor address ranges to memory module address ranges. In one or more embodiments of the invention, the processor and/or memory controller memory controller stores the processor address ranges in the address association table thereby providing a mapping between each processor address range and corresponding memory channel (as indicated by the memory channel identifier) and memory module address range.

Figure 5A:
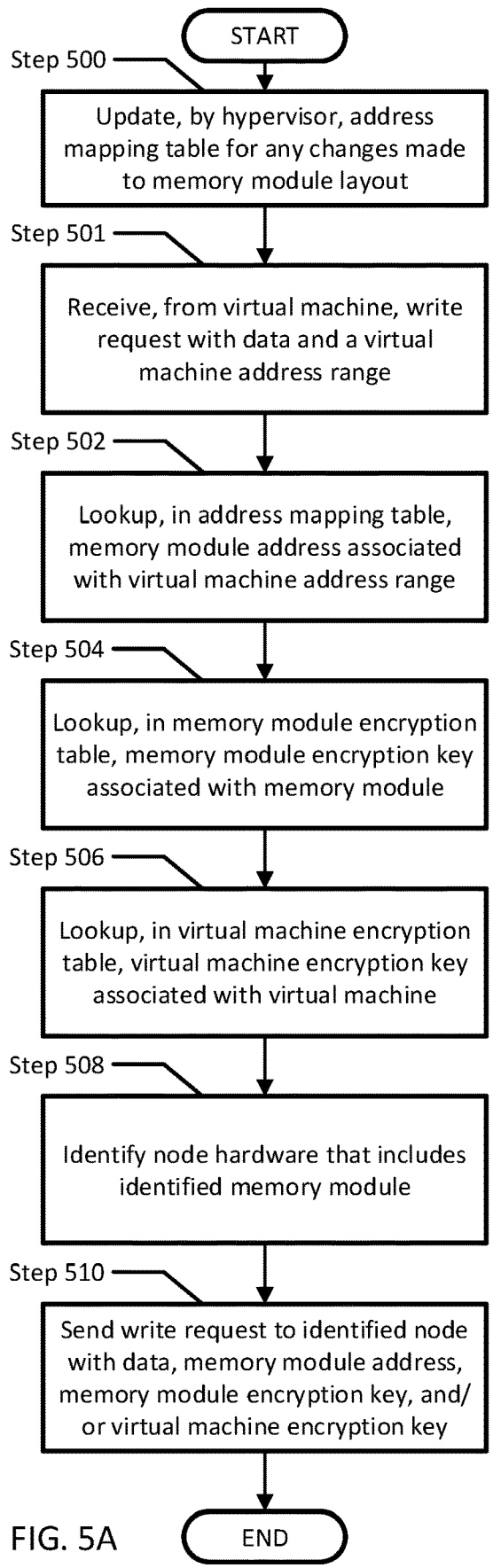
FIG. 5A shows a flowchart of a method of handling a write request, in accordance with one or more embodiments of the invention.

FIG. 5A shows a flowchart of a method of handling a write request, in accordance with one or more embodiments of the invention. All or a portion of the method shown in FIG. 5A may be performed by one or more components of the hypervisor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 500, the hypervisor updates the address mapping table for any changes (i.e., a "configuration change") made to the underlying hardware resources of one or more operatively connected nodes (e.g., a change in the layout of one or more memory module(s)). In one or more embodiments of the invention, the hypervisor is configured to periodically scan the underlying hardware resources of each operatively connected node to identify any changes in the hardware layout of those nodes. As a non-limiting example, the hypervisor may be configured to identify that one or more memory modules was removed, added, swapped positions, installed elsewhere, and otherwise altered such that the existing address mapping table is no longer accurate and needs to be updated (e.g., the associated processor address ranges no longer correctly map the virtual machine address ranges to their corresponding memory module address ranges).

In one or more embodiments of the invention, the hypervisor maintains the memory module identifier for each associated entry in the address mapping table. Accordingly, the hypervisor is configured identify each memory module of the nodes and attempt to match the memory module identifier of each memory module to an entry in the address association table. If the processor mapping is no longer accurate, the hypervisor updates the address mapping table entry to include the proper processor address range between the virtual machine address range and the memory module address range.

In Step 501, a hypervisor receives, from a virtual machine, a write request (with data, a virtual machine address range, and/or virtual machine identifier). In one or more embodiments of the invention, a virtual machine may not be configured directly communicate with the hardware components of the node without first interacting with the hypervisor. Accordingly, in one or more embodiments of the invention, the hypervisor may intercept all read and write requests issued by a virtual machine. In an instance where a virtual machine issues a write request, the write request may specify a virtual machine memory address (or range) (used by the virtual machine) and the data to be written to those virtual machine address range(s). Further, the virtual machine may include a unique virtual machine identifier when interacting with the hypervisor and/or the hypervisor may be configured to associate all messages (e.g., commands, requests, etc.) with a virtual machine identifier of the virtual machine.

In one or more embodiments of the invention, the hypervisor may not be directly involved in data manipulation processes (e.g., the reading and/or writing of data). Instead, the hypervisor may configure the processor to perform processes requested by one or more virtual machines on behalf of the hypervisor (without initiating slower and/or additional user space processes). Further, although the "hypervisor" is referred to as a separate entity herein, the processes performed by the hypervisor (or any other software entity) are performed by a processor. Accordingly, communications between a "hypervisor" and a "processor" may refer to one or more processes occurring on the same processor where individual steps of reading, writing, and/or otherwise manipulating data are commanded by different software instances.

In Step 502, the hypervisor performs a lookup, in the address mapping table, and identifies a memory module address range associated with the virtual machine address range. In one or more embodiments of the invention, the hypervisor initially generates and maintains an address mapping table that provides mappings between virtual machine address ranges (used by the virtual machine), processor address ranges (used by the memory controller of the processor), and memory module address ranges (used by the memory modules). Accordingly, in one or more embodiments of the invention, the hypervisor independently tracks the mappings between virtual addresses (e.g., the virtual machine address ranges and the processor address ranges) and physical addresses (e.g., the memory module address ranges). Further, the hypervisor may additionally identify the memory module identifier, specified in the address mapping table, and associated with the corresponding memory module address range.

In Step 504, the hypervisor performs a lookup, in the memory module encryption table, and identifies a memory module encryption key associated with the memory module. In one or more embodiments of the invention, the hypervisor initially generates and maintains the memory module encryption table to provide a unique encryption key associated with each memory module. Upon receipt of a write request, the hypervisor may identify the memory module encryption key associated with the memory module associated with the memory module identifier (identified in Step 502).

In Step 506, the hypervisor performs a lookup, in the virtual machine encryption table, and identifies a virtual machine encryption key associated with the virtual machine that sent the write request. In one or more embodiments of the invention, the hypervisor initially generates and maintains the virtual machine encryption table to provide a unique encryption key associated with each virtual machine. Upon receipt of a write request, the hypervisor identifies the virtual machine encryption key associated with the virtual machine by performing a lookup in the virtual machine encryption table using the virtual machine identifier and finding the associated virtual machine encryption table entry.

One of Steps 504 and 506 may be skipped. In one or more embodiments of the invention, only a single encryption key is needed to encrypt the data. Accordingly, either (i) the memory module encryption key (identified in Step 504) or (ii) the virtual machine encryption key (identified in Step 506) is sufficient to encrypt the data. However, in one or more embodiments of the invention, both the memory module encryption key and the virtual machine encryption key may be used to encrypt the data specified by the write request.

In Step 508, the hypervisor identifies the node that includes the memory module identified in Step 502. In one or more embodiments of the invention, as the hypervisor is operatively connected to two or more nodes, the hypervisor may need to identify the particular node that includes and/or is operatively connected to the memory module associated with the virtual machine address range. Accordingly, the hypervisor may use one or more data structures to identify the node that includes the identified memory module and some associated identifier and means of communicating with that node (e.g., and internet protocol (IP) address).

In Step 510, the hypervisor sends, to the identified node, the write request (i.e., an "encryption request") with the data, the memory module address range (identified in Step 502), the memory module encryption key (identified in Step 504), and/or the virtual machine encryption key (identified in Step 506). In one or more embodiments of the invention, the hypervisor may only send the write request with one of (i) the memory module encryption key or (ii) the virtual machine encryption key, depending on if Step 502 or Step 504 was skipped.

Although a "hypervisor" is specified as performing the method of FIG. 5A, one of ordinary skill in the art, having the benefit of this detailed description, would appreciate that any capable software, executing on any capable hardware, may perform this same process (e.g., a traditional operating system executing on a local machine, software executing within a virtualized container environment on one or more machines, etc.). Accordingly, the functionalities of the hypervisor described in FIG. 5A should not be limited to hypervisors, but may be applicable to any configured software executing on capable hardware.

Further, in one or more embodiments of the invention, the hypervisor may not perform the method steps of FIG. 5A for each write request received from a virtual machine. Rather, in one or more embodiments of the invention, a hypervisor may configure a processor so that the processor is capable of performing Steps 500-506. As a non-limiting example, the hypervisor (and/or any other software) may send the address mapping table, memory module encryption table, and/or virtual machine encryption table to a processor, such that the processor may perform the lookups of Steps 502, 504, and 506, respectively. Additionally, in one or more embodiments of the invention, a virtual machine (and/or any other software) may pass a write request to a configured processor (without interacting with intermediary software) such that the processor performs Steps 500-506 independently.

Figure 5B:
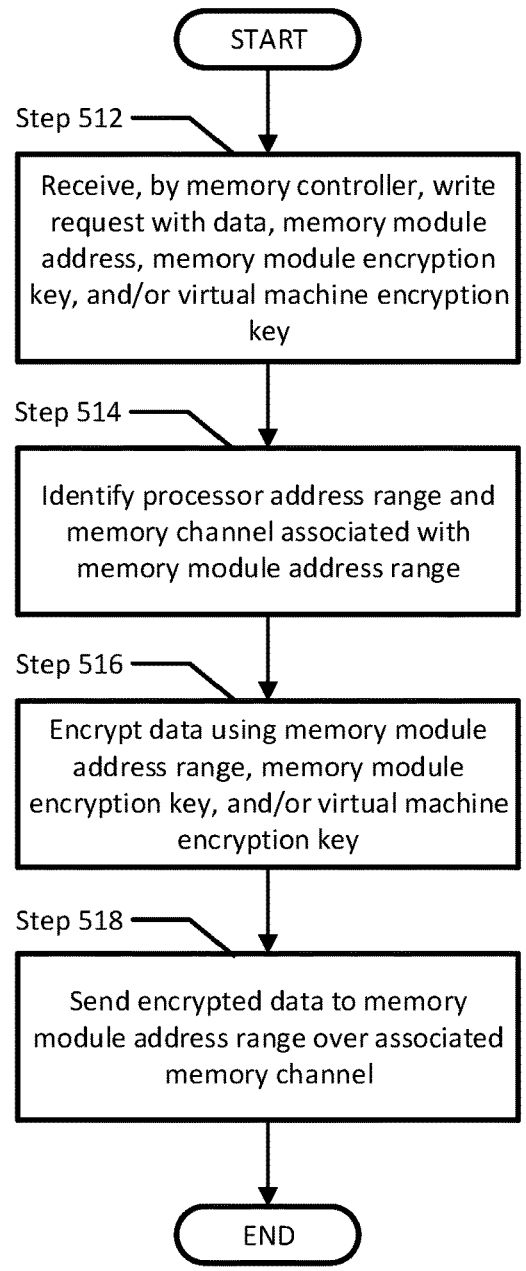
FIG. 5B shows a flowchart of a method of encrypting data of a write request, in accordance with one or more embodiments of the invention.

FIG. 5B shows a flowchart of a method of encrypting data of a write request, in accordance with one or more embodiments of the invention. All or a portion of the method shown in FIG. 5B may be performed by one or more components of the memory controller. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 512, a memory controller receives a write request that includes unencrypted data, a memory module address range, a memory module encryption key, and/or a virtual machine encryption key. In one or more embodiments of the invention, the memory controller may only receive the write request with one of (i) the memory module encryption key or (ii) the virtual machine encryption key, depending on if Step 502 or Step 504 was skipped.

In one or more embodiments of the invention, the memory controller writes the data to cache upon receipt from the hypervisor. In one or more embodiments of the invention, the write request may be received at the processor by one or more communication interfaces of the nodes that are executing the hypervisor and include the processor.

In Step 514, the memory controller identifies the processor address range and memory channel associated with the memory module address range. In one or more embodiments of the invention, as the memory module address range was included in the write request (and not a processor address range), the memory controller performs a lookup in the address association table to identify the memory channel and processor address range associated with the received memory module address range.

In Step 516, the memory controller encrypts the data using a pre-configured encryption algorithm, the memory module address range, and either (i) the memory module encryption key, (ii) virtual machine encryption key, or (iii) both the memory module encryption key and virtual machine encryption key. One of ordinary skill in the art, having the benefit of this detailed description, would appreciate that any standard encryption algorithm may be utilized for encrypting the data.

In Step 518, the memory controller sends the encrypted data to the memory module address range over the associated memory channel (identified in Step 514). In one or more embodiments of the invention, the memory controller may clear the cache of the unencrypted data after the encrypted data is confirmed to have been persisted to the memory module.

Although a "hypervisor" is specified as performing the method of FIG. 5B, one of ordinary skill in the art, having the benefit of this detailed description, would appreciate that any capable software, executing on any capable hardware, may perform this same process (e.g., a traditional operating system executing on a local machine, software executing within a virtualized container environment on one or more machines, etc.). Accordingly, the functionalities of the hypervisor described in FIG. 5B should not be limited to hypervisors, but may be applicable to any configured software executing on capable hardware.

Figure 6A:
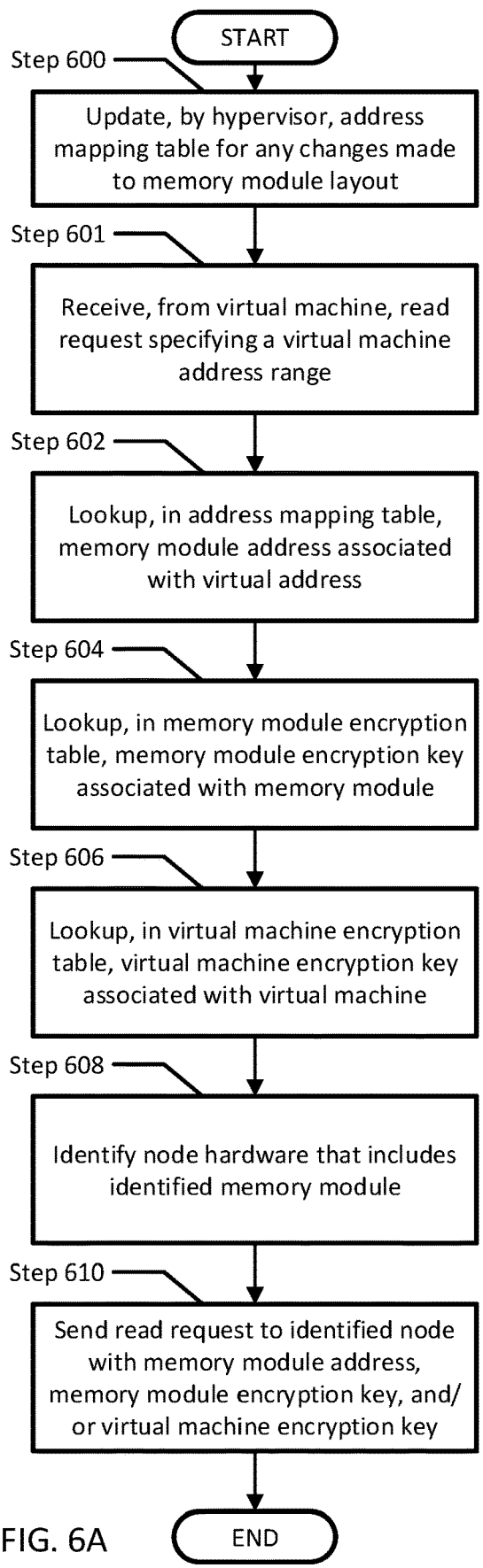
FIG. 6A shows a flowchart of a method of a read request, in accordance with one or more embodiments of the invention.

FIG. 6A shows a flowchart of a method of a read request, in accordance with one or more embodiments of the invention. All or a portion of the method shown in FIG. 6A may be performed by one or more components of the hypervisor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 600, the hypervisor updates the address mapping table for any changes made to the underlying hardware resources of one or more operatively connected nodes (e.g., a change in the layout of one or more memory module(s)). Step 600 is substantially similar to Step 500 as discussed in the description of FIG. 5A.

In Step 601, a hypervisor receives, from a virtual machine, a read request specifying a virtual machine address range (and a virtual machine identifier associated with the sending virtual machine). Step 601 is substantially similar to Step 501 except that the hypervisor is handling a read request for encrypted data (instead of a write request of unencrypted data).

In Step 602, the hypervisor performs a lookup, in the address mapping table, and identifies a memory module address range associated with the virtual machine address range. Step 602 is substantially similar to Step 502 as discussed in the description of FIG. 5A.

In Step 604, the hypervisor performs a lookup, in the memory module encryption table, and identifies a memory module encryption key associated with the memory module. Step 604 is substantially similar to Step 504 as discussed in the description of FIG. 5A.

In Step 606, the hypervisor performs a lookup, in the virtual machine encryption table, and identifies a virtual machine encryption key associated with the virtual machine that sent the read request. Step 606 is substantially similar to Step 506 as discussed in the description of FIG. 5A.

One of Steps 604 and 606 may be skipped. In one or more embodiments of the invention, only a single encryption key may be needed to decrypt the data. Accordingly, either (i) the memory module encryption key (identified in Step 604) or (ii) the virtual machine encryption key (identified in Step 606) may be sufficient to decrypt the data. However, in one or more embodiments of the invention, both the memory module encryption key and the virtual machine encryption key may be used to decrypt the data specified by the read request.

In Step 608, the hypervisor identifies the node that includes the memory module (identified in Step 602). Step 608 is substantially similar to Step 508 as discussed in the description of FIG. 5A.

In Step 610, the hypervisor sends, to the identified node, the read request (i.e., "decryption request") with the memory module address range (identified in Step 602), the memory module encryption key (identified in Step 604), and/or the virtual machine encryption key (identified in Step 606). In one or more embodiments of the invention, the hypervisor may only send the read request with one of (i) the memory module encryption key or (ii) the virtual machine encryption key, depending on if Step 602 or Step 604 was skipped.

Although a "hypervisor" is specified as performing the method of FIG. 6A, one of ordinary skill in the art, having the benefit of this detailed description, would appreciate that any capable software, executing on any capable hardware, may perform this same process (e.g., a traditional operating system executing on a local machine, software executing within a virtualized container environment on one or more machines, etc.). Accordingly, the functionalities of the hypervisor described in FIG. 6A should not be limited to hypervisors, but may be applicable to any configured software executing on capable hardware.

Further, in one or more embodiments of the invention, the hypervisor may not perform the method steps of FIG. 6A for each read request received from a virtual machine. Rather, in one or more embodiments of the invention, a hypervisor may configure a processor so that the processor is capable of performing Steps 600-606. As a non-limiting example, the hypervisor (and/or any other software) may send the address mapping table, memory module encryption table, and/or virtual machine encryption table to a processor, such that the processor may perform the lookups of Steps 602, 604, and 606, respectively. Additionally, in one or more embodiments of the invention, a virtual machine (and/or any other software) may pass a write request to a configured processor (without interacting with intermediary software) such that the processor performs Steps 600-606 independently.

Figure 6B:
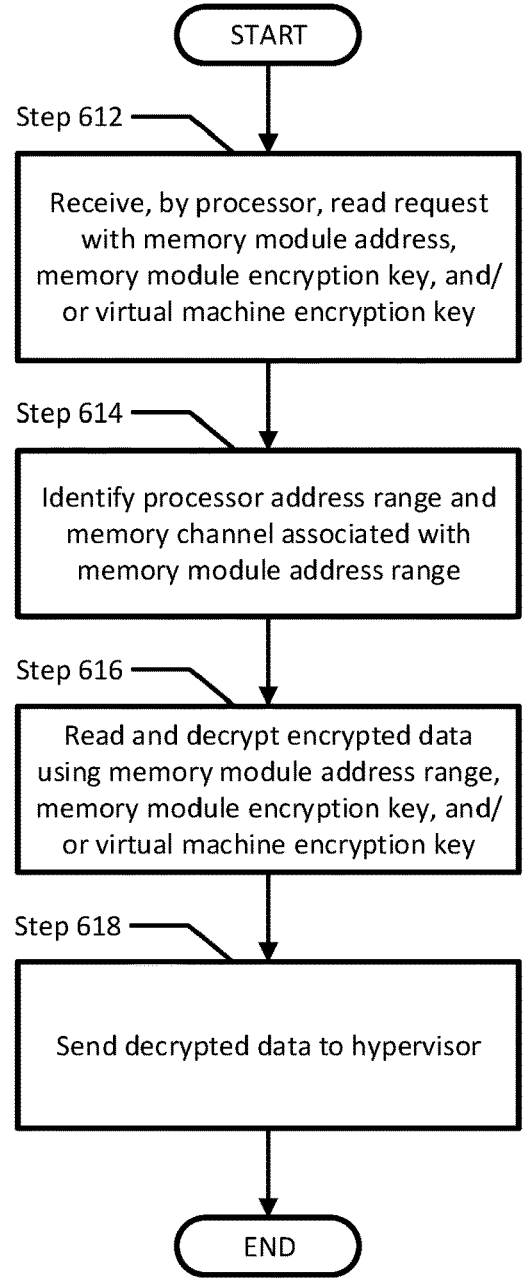
FIG. 6B shows a flowchart of a method of decrypting data of a read request, in accordance with one or more embodiments of the invention.

FIG. 6B shows a flowchart of a method of decrypting data of a read request, in accordance with one or more embodiments of the invention. All or a portion of the method shown in FIG. 6B may be performed by one or more components of the processor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 612, a processor and/or memory controller thereof, receives a read request that includes a memory module address range, a memory module encryption key, and/or a virtual machine encryption key. In one or more embodiments of the invention, the processor may only receive the read request with one of (i) the memory module encryption key or (ii) the virtual machine encryption key, depending on if Step 602 or Step 604 was skipped.

In Step 614, the processor identifies the processor address range and memory channel associated with the memory module address range. In one or more embodiments of the invention, as the memory module address range was included in the read request (instead of a processor address range), the processor performs a lookup in the address association table to identify the memory channel and processor address range associated with the received memory module address range.

In Step 616, the processor reads the encrypted data from the memory module address range (identified in Step 614) over the associated memory channel and decrypts the data before copying the decrypted data to cache. The processor may use the same pre-configured encryption algorithm used to encrypt the data. Further, in one or more embodiments of the invention, the processor uses the memory module address range (from which the data is read) and either (i) the memory module encryption key, (ii) virtual machine encryption key, or (iii) both the memory module encryption key and virtual machine encryption key, to decrypt the data.

In Step 618, the processor uses the memory controller to send the decrypted data to the hypervisor (to be sent to the virtual machine that initially generated the read request). In one or more embodiments of the invention, the processor may send the decrypted data to the hypervisor via a communication interface that operatively connects the node that includes the processor and memory controller and the node on which the hypervisor is executing and/or the node on which the virtual machine is executing.

Figure 7A:
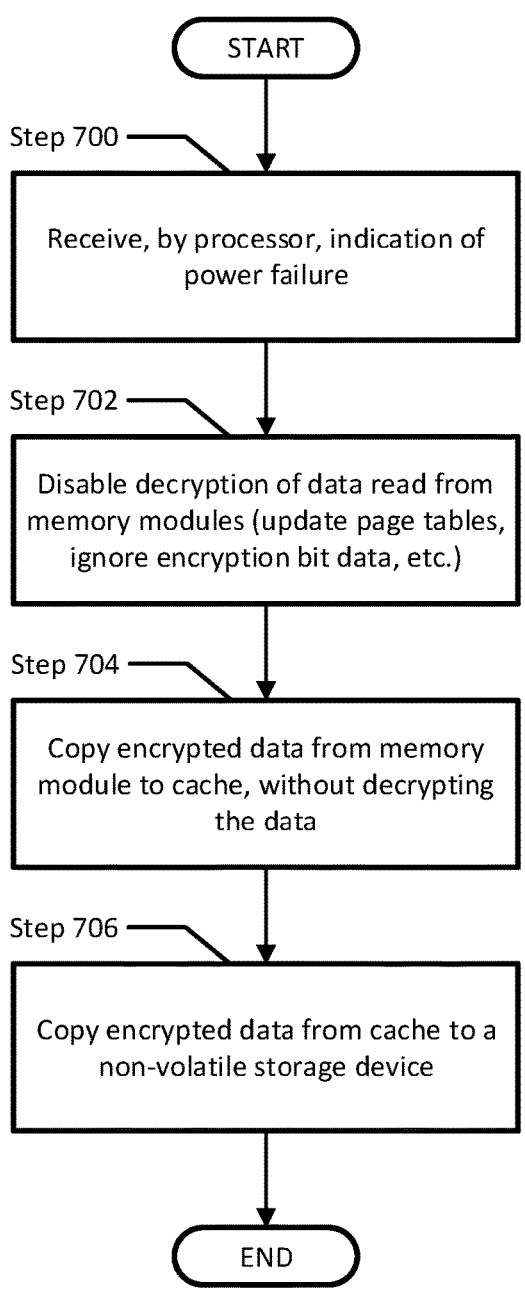
FIG. 7A shows a flowchart of a method of transferring data in a power interruption event, in accordance with one or more embodiments of the invention.

FIG. 7A shows a flowchart of a method of transferring data in a power interruption event, in accordance with one or more embodiments of the invention. All or a portion of the method shown in FIG. 7A may be performed by one or more components of the processor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 700, a processor, and/or memory controller thereof, receives indication of a power failure and/or power interruption. In one or more embodiments of the invention, the processor and/or memory controller may be configured to receive one or more system alerts from the node that power to the system has been interrupted and initiate one or more processes based on that alert. In one or more embodiments of the invention, if continuous external power to the node is interrupted, the power source of the node continues to power the processor and memory modules for a limited time (i.e., until the stored potential energy of the power source is exhausted).

In Step 702, the processor instructs memory controller to disable decryption of data that is read from memory modules. In one or more embodiments of the invention, the memory controller may be configured to automatically decrypt data read from certain memory module address ranges. As a non-limiting example, the address association table may indicate that certain memory channels, process address ranges, and/or memory module address ranges must be encrypted when data is written to a memory module and decrypted when data is read from a memory module. The memory controller may be configured to first read the address association table to identify if encryption and decryption is required for the requested operation.

However, in response to receiving indication that there has been a power failure (and/or other power interruption) to the node, the memory controller disables decryption of data read from any memory module. To accomplish this, as a non-limiting example, the memory controller may modify the address association table to indicate that all data stored in the memory modules is unencrypted and therefore does not need to be decrypted when read (even though the data stored in the memory modules may be encrypted). Alternatively, as another non-limiting example, the memory controller may be configured to skip the step of reading the address association table and treat all data stored on the memory modules as though it is unencrypted (and therefore may be copied to cache without decryption).

In Step 704, the processor uses the memory controller to copy the encrypted data from the memory module to cache, without decrypting the encrypted data. In one or more embodiments of the invention, the memory controller copies all data from one or more memory modules to the cache of the processor via the memory channels associated with the memory modules storing the data. In one or more embodiments of the invention, some or all of the data stored on the memory modules may be encrypted. And, in the event of receiving indication of a power interruption, all data (encrypted data and unencrypted data) is copied from the memory modules to cache in the same form (encrypted and unencrypted) as stored on the memory modules without decryption by the memory controller.

In Step 706, the processor uses the memory controller to copy the encrypted data from cache to the non-volatile storage device. In one or more embodiments of the invention, the processor copies the encrypted data to the non-volatile storage device so that the encrypted data is not erased if all power (e.g., from external and internal power sources) to the node is lost. In one or more embodiments of the invention, the memory modules may store more data than available size of the cache. Accordingly, the processor, and/or memory controller thereof, may copy the data from the memory modules to cache, then cache to a non-volatile storage device two or more times before all data is copied off of the memory modules and stored in the non-volatile storage device.

In one or more embodiments of the invention, after the processor finishes copying the encrypted data to the non-volatile storage device, the remaining energy in the power source may dissipate causing the processor and memory modules to lose all electrical power. However, as the encrypted data is stored on the non-volatile storage device, the data continues to persist in a non-volatile state, even without continuously supplied electrical power from external or internal power sources.

While FIG. 7A describes copying encrypted data from one or more memory module(s) to a non-volatile storage device using cache (of the processor), in other embodiments of the invention the encrypted data may be copied from one or more memory module(s) to the non-volatile storage device without using the cache. In such scenarios, the processor may initiate the copying of the encrypted data from the one or more memory module(s) to the non-volatile storage device, without being copied to cache, and without decrypting the encrypted data. That is, in one or more embodiments of the invention, the non-volatile storage device and one or more memory module(s) may be operatively connected via a Peripheral Component Interconnect (PCI) bus, PCI express (PCIe) bus, or a memory bus, such that the non-volatile storage device and one or more memory module(s) may communicate and transfer data without using the processor as an intermediary device, and without decrypting the encrypted data.

In such instances, the processor may instruct the non-volatile storage device to copy the data from one or more memory module(s), without decryption, and store the encrypted data on the non-volatile storage device. Further, if the processor instructs the non-volatile storage device to copy the encrypted data from one or more memory module (s) to the non-volatile storage device, the processor does not perform Steps 704-706. Instead, after the processor initiates the aforementioned copying, the encrypted data is copied from one or more memory module(s) to the non-volatile storage device without using the processor cache described in Step 704-706. Accordingly, the aforementioned copying may be performed by, e.g., (i) the processor using cache (as described in FIG. 7A), (ii) the non-volatile storage device directly with one or more memory module(s) (as initiated by the processor), or (iii) another hardware element instructed by the processor to perform the copying (e.g., a direct memory access (DMA) engine).

Figure 7B:
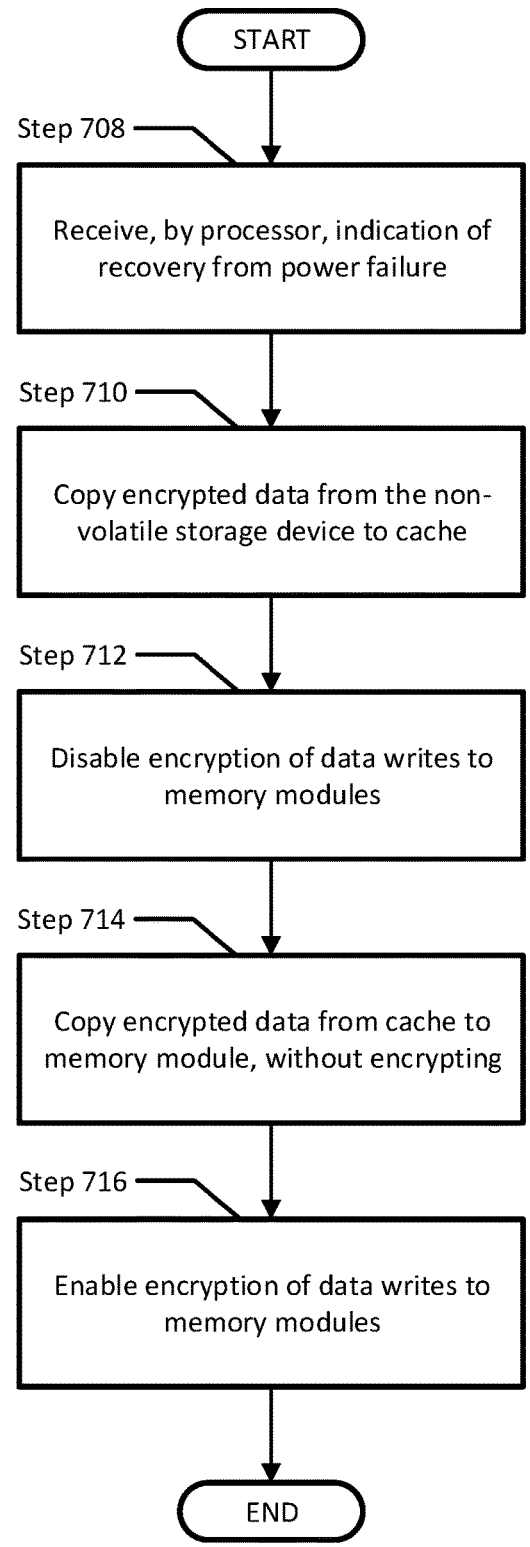
FIG. 7B shows a flowchart of a method of restoring data after a power interruption event, in accordance with one or more embodiments of the invention.

FIG. 7B shows a flowchart of a method of restoring data after a power interruption event, in accordance with one or more embodiments of the invention. All or a portion of the method shown in FIG. 7B may be performed by one or more components of the processor. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 708, a processor receives indication of that the node is restarting from a power failure. In one or more embodiments of the invention, the processor a may be configured to receive one or more system alerts from the node that power to the system has been restored from a previously failed power state and, based on that alert, initiate one or more processes.

In Step 710, the processor uses the memory controller to copy encrypted data from the non-volatile storage device to cache. In one or more embodiments of the invention, the processor and/or memory controller is configured to automatically copy data stored on the non-volatile storage device to the cache of the processor upon recovering from a power failure event (as determined by the indication received in Step 708).

In Step 712, the processor disables encryption of data written to the memory modules by the memory controller. Similar to the description of Step 702 for FIG. 7A, the memory controller may be configured to automatically encrypt data written to certain memory module address ranges. As a non-limiting example, the address association table may indicate that certain memory channels, process address ranges, and/or memory module address ranges must be encrypted when data is written to a memory module and decrypted when data is read from a memory module. The processor and/or memory controller may be configured to first read the address association table to identify if encryption and decryption is required for the requested operation.

However, in response to receiving indication that the node is recovering from a power failure event, the processor disables encryption of data written to any memory module by the memory controller. As a non-limiting example, the processor may modify the address association table to indicate that all data should be written to memory modules in an unencrypted state (even though some of the data is already encrypted). Alternatively, as another non-limiting example, the processor may be configured to skip the step of reading the address association table and treat all data written the memory modules as though it is to remain unencrypted (and can be copied without encryption).

In Step 714, the processor copies the encrypted data from cache to one or more memory module(s), without encrypting that data. In one or more embodiments of the invention, the memory controller copies the encrypted data to the locations at which the encrypted data was previously stored location on the memory modules. Further, in one or more embodiments of the invention, the non-volatile storage device may store more data than available size of the cache. Accordingly, the memory controller may copy the data from the non-volatile storage device to cache, then cache to memory modules two or more times before all data is copied off of the non-volatile storage device and onto to the memory modules.

In Step 716, the processor enables encryption and decryption of data written to the memory modules by the memory controller. As a non-limiting example, the processor may modify the address association table to undue any changes made to the address association table in Steps 702 and 712. Alternatively, as another non-limiting example, the processor may be configured to begin performing the step of reading the address association table before reading and/or writing data to the memory modules such that any encryption and/or decryption requirements specified therein are performed when required. The process may end following Step 716. While FIG. 7B describes copying encrypted data from a non-volatile storage device to one or more memory module(s) using the cache (of the processor), in other embodiments of the invention the encrypted data may be copied from a non-volatile storage device to one or more memory module(s) without using the cache. In such scenarios, the processor may initiate the copying of the encrypted data from the non-volatile storage device to one or more memory module(s), without using the processor cache as an intermediary device, and without re-encrypting the already-encrypted data.

In such instances, the processor may instruct the non-volatile storage device to copy the data from non-volatile storage device to one or more memory module(s), without re-encrypting the already-encrypted data. Further, if the processor instructs the non-volatile storage device to copy the encrypted data, the processor does not perform Steps 710-714. Instead, after the processor initiates the aforementioned copying, the encrypted data is copied from the non-volatile storage device to one or more memory module (s). Accordingly, the aforementioned copying may be performed by, e.g., (i) the processor using cache (as described in FIG. 7B), (ii) the non-volatile storage device directly with one or more memory module(s) (as initiated by the processor), or (iii) another hardware element instructed by the processor to perform the copying (e.g., a DMA engine).

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for storing encrypted data in a non-volatile storage device, comprising:
    receiving, by a processor, an indication of a power interruption event;
    disabling, based on the indication, decryption of encrypted data read from a volatile memory module;
    initiating copying of the encrypted data from the volatile memory module to the non-volatile storage device; and
    after initiating the copying of the encrypted data from the volatile memory module to the non-volatile storage device:
        receiving a second indication of a power recovery event;
        disabling, based on the second indication, encryption of data written to the volatile memory module;
        initiating copying the encrypted data from the non-volatile storage device to the volatile memory module.

2. The method of claim 1, wherein disabling the decryption of encrypted data comprises:
    modifying an address association table to indicate that the encrypted data on the volatile memory module is unencrypted.

3. The method of claim 1, wherein initiating copying of the encrypted data from the non-volatile storage device to the volatile memory module comprises:
    copying the encrypted data from the volatile memory module to cache; and
    copying the encrypted data from the cache to the non-volatile storage device.

4. The method of claim 1, wherein initiating copying of the encrypted data from the non-volatile storage device to the volatile memory module comprises:
    sending a copy command to the non-volatile storage device, wherein the copy command instructs the non-volatile storage device to copy the encrypted data from the volatile memory module to the non-volatile storage device.

5. The method of claim 1, wherein disabling the encryption of data comprises:
    modifying an address association table to indicate that the encrypted data is to not be encrypted.

6. The method of claim 1, further comprising:
    after initiating copying the encrypted data from the non-volatile storage device to the volatile memory module:
        modifying an address association table to indicate that the encrypted data on the volatile memory module is encrypted.

7. The method of claim 1, wherein the power interruption event is a loss of continuous external power.

8. The method of claim 7, wherein after receiving the indication of power interruption event, a capacitor provides power to the processor and the volatile memory module.

9. The method of claim 1, wherein initiating copying of the encrypted data from the volatile memory module to the non-volatile storage device comprises:
    copying the encrypted data from the volatile memory module to cache; and
    copying the encrypted data from the cache to the non-volatile storage device.

10. The method of claim 1, wherein initiating copying of the encrypted data from the volatile memory module to the non-volatile storage device comprises:
    sending a copy command to the non-volatile storage device, wherein the copy command instructs the non-volatile storage device to copy the encrypted data from the volatile memory module to the non-volatile storage device.

11. A non-transitory computer readable medium comprising instructions which, when executed by a computer processor, enables the computer processor to perform a method for storing encrypted data in a non-volatile storage device, comprising:
    receiving, by a processor, an indication of a power interruption event;
    disabling, based on the indication, decryption of encrypted data read from a volatile memory module;
    initiating copying of the encrypted data from the volatile memory module to the non-volatile storage device; and
    after initiating the copying of the encrypted data from the volatile memory module to the non-volatile storage device:
        receiving a second indication of a power recovery event;
        disabling, based on the second indication, encryption of data written to the volatile memory module; and initiating copying the encrypted data from the non-volatile storage device to the volatile memory module.

12. The non-transitory computer readable medium of claim 11, wherein disabling the decryption of encrypted data comprises:
   modifying an address association table to indicate that the encrypted data on the volatile memory module is unencrypted.

13. The non-transitory computer readable medium of claim 11, wherein initiating copying of the encrypted data from the non-volatile storage device to the volatile memory module comprises:
   copying the encrypted data from the volatile memory module to cache; and
   copying the encrypted data from the cache to the non-volatile storage device.

14. The non-transitory computer readable medium of claim 11, wherein initiating copying of the encrypted data from the non-volatile storage device to the volatile memory module comprises:
   sending a copy command to the non-volatile storage device, wherein the copy command instructs the non-volatile storage device to copy the encrypted data from the volatile memory module to the non-volatile storage device.

15. The non-transitory computer readable medium of claim 11, further comprising:
   after initiating copying the encrypted data from the non-volatile storage device to the volatile memory module:
      modifying an address association table to indicate that the encrypted data on the volatile memory module is encrypted.

16. The non-transitory computer readable medium of claim 11, wherein initiating copying of the encrypted data from the volatile memory module to the non-volatile storage device comprises:
   copying the encrypted data from the volatile memory module to cache; and
   copying the encrypted data from the cache to the non-volatile storage device.

17. The non-transitory computer readable medium of claim 11, wherein initiating copying of the encrypted data from the volatile memory module to the non-volatile storage device comprises:
   sending a copy command to the non-volatile storage device, wherein the copy command instructs the non-volatile storage device to copy the encrypted data from the volatile memory module to the non-volatile storage device.

18. A node, comprising:
   a non-volatile storage device;
   a volatile memory module;
   a processor, wherein the processor is configured to perform a method for storing encrypted data in the non-volatile storage device, comprising:
      receiving, by the processor, an indication of a power interruption event;
      disabling, based on the indication, decryption of encrypted data read from the volatile memory module;
      initiating copying of the encrypted data from the volatile memory module to the non-volatile storage device; and
      after initiating the copying of the encrypted data from the volatile memory module to the non-volatile storage device:
         receiving a second indication of a power recovery event;
         disabling, based on the second indication, encryption of data written to the volatile memory module; and
         initiating copying the encrypted data from the non-volatile storage device to the volatile memory module.

* * * * *